United States Patent [19] [11] 3,836,774

Guzman et al. [45] Sept. 17, 1974

[54] CAPSTAN-TACHOMETER ASSEMBLY

[75] Inventors: Adolfo M. Guzman; Paul Y. Hu, both of Boulder; Tracy N. Waller, Broomfield, all of Colo.

[73] Assignee: International Business Machines Corporation, Armonk, N.Y.

[22] Filed: Aug. 6, 1973

[21] Appl. No.: 385,942

[52] U.S. Cl. .......................... 250/231 R, 250/232 R
[51] Int. Cl. .......................... G01d 5/34, G01d 5/36
[58] Field of Search .......... 250/237 G, 231, 231 SE, 250/232; 356/169

[56] References Cited

FOREIGN PATENTS OR APPLICATIONS 1,259,621 1/1968 Germany ........................ 250/231 SE

*Primary Examiner*—James W. Lawrence
*Assistant Examiner*—T. N. Grigsby
*Attorney, Agent, or Firm*—Francis A. Sirr

[57] ABSTRACT

A tape drive capstan includes an optical see-thru tachometer disc having a large number of alternating opaque and transparent regions, such that the passage of each opaque region is a measure of a unit distance of capstan rotation. Rotational movement and direction are sensed by a two-phase tachometer which includes the capstan disc as the moving member thereof. Two phototransitors are closed spaced and view the tachometer disc through a stationary slit mask. A single light source and a mechanical light collimator illuminate the capstan disc with two closely spaced and parallel light paths having minimum crosstalk. The phototransistors, mask and light collimator are accurately aligned.

9 Claims, 10 Drawing Figures

FIG. 3
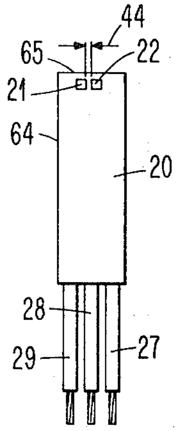
FIG. 4
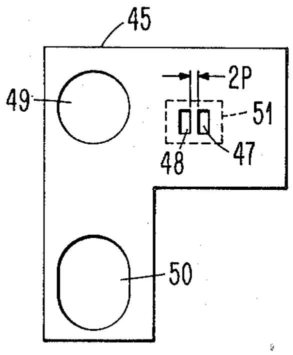
FIG. 4a
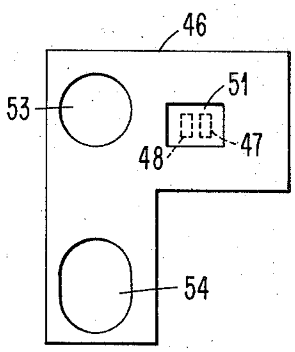
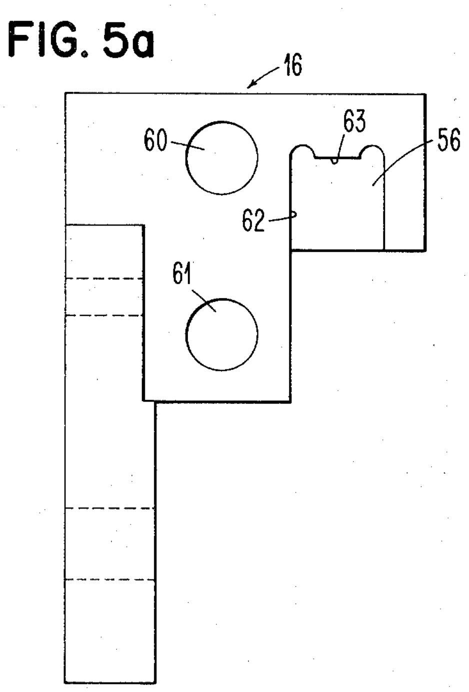
FIG. 5
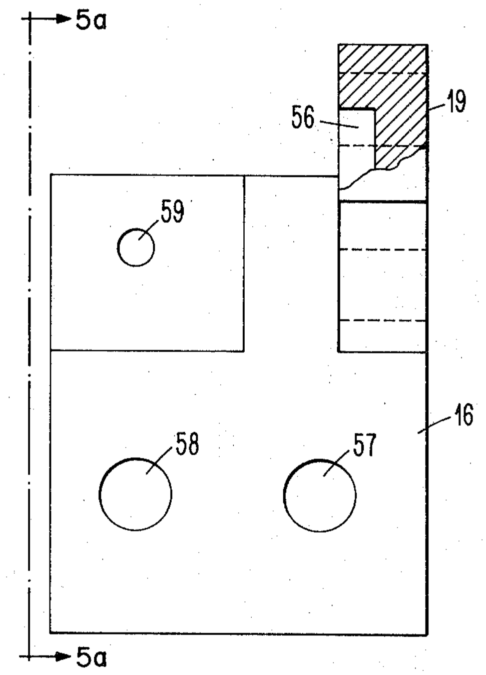
FIG. 7
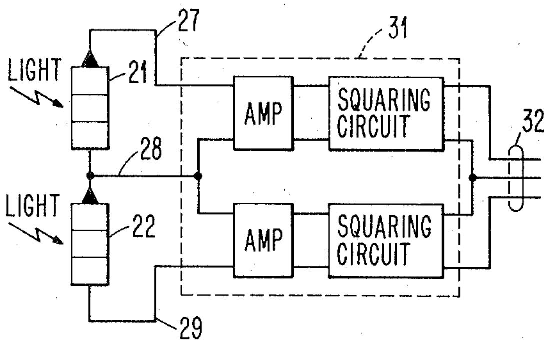
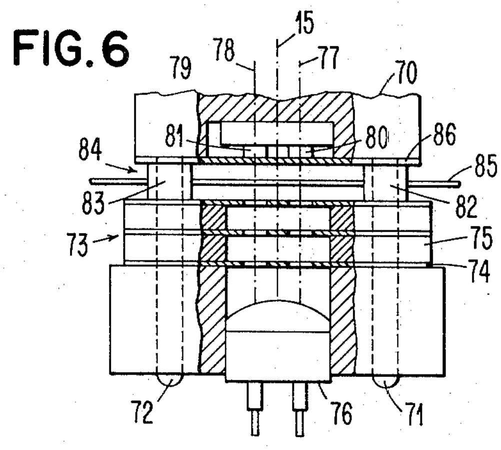

CAPSTAN-TACHOMETER ASSEMBLY

BACKGROUND AND SUMMARY OF THE INVENTION

The present invention relates to the field of ditigal tachometers of the see-thru optical type wherein a movable optical member includes alternate transparent and opaque regions in a repeating pattern. The passage of each transparent region past a given point, as detected for example by a photocell, is a measure of a unit distance of movement of the optical member. This unit distance is defined as one pitch distance, and is the distance between the centerline of adjacent transparent regions. The number of pitch distances can be counted as a measure of total distance moved. The number of pitch distances per unit time, or the time between adjacent transparent regions, can be measured as sampled-data capstan speed.

When it is desired to detect direction of movement, it is necessary to provide two photocells and a mask positioned in front of each of the photocells, so that each photocell independently views the movable member through a mask. These masks include a pattern of alternate transparent and opaque regions having the same pitch as the movable member. However, the optical pattern of one mask is spaced from the optical pattern of the other mask by an integral number of pitch distances, plus or minus one-quarter of a pitch distance. In this manner, the two photocells provide output signals of the same frequency, but phase shifted by 90°. The phase position of one signal with respect to the other is decoded as the direction of motion of the movable member.

Ideally, the spatial separation of the two photocells should be held to a minimum, the minimum being, of course, three-fourths of a pitch distance. As the line density or pitch distance of the movable member is made smaller, to thereby increase the sampledata frequency, the size of the photocells, and the crosstalk between the light passing through the two masks, limits the ability of prior art devices to approach this desired minimum spacing.

The present invention advances the prior art by a unique combination of structural elements. In order to minimize the spacing of the photodetectors, two small phototransistor chips are positioned in close proximity on an epoxy glass laminate printed circuit card or board. These phototransistors are covered by a thin stationary mask carrying two closely spaced optical patterns, one for each photocell. This close phototransistor spacing insures minimum undesirable phase shift between the two phototransistor output signals as manufacturing tolerances produce slight misalignment of the mask patterns with the pattern carried by the movable member, as well as distance variations between the disc and mask.

This close phototransistor spacing, while having a desirable effect, may result in crosstalk between the light passing through the moving member and the stationary mask. That is, light which is intended to strike one phototransistor may, in fact, strike the other phototransistor, producing crosstalk.

This crosstalk is greatly reduced in the present invention by the use of a mechanical light collimator which, in cooperation with a single light source, illuminates the moving member with two closely spaced light rays or paths. The light collimator is made up of alternate thin shims and thick shims. The thin shims include accurately aligned openings which define the two light paths. The thick shims serve to space the thin shims along the light paths, and additionally include large openings which peripherally surround the small openings in the thin shims, to thereby define light traps which function to trap light rays which pass through a first small opening but are not sufficiently in alignment with the next small opening to pass therethrough.

The two light paths thus defined are accurately controlled, using the apparatus of the present invention, by the use of alignment means in the form of pins or manufacturing holes which cooperate with the above-mentioned circuit board, stationary mask and light collimator to insure accurate alignment of these members along the two light paths.

The present invention finds particular utility in a capstan/tachometer assembly of the type used to control the movement of tape in a magnetic tape unit associated with digital computation. Increased data rates and magnetic tape data density have made it increasingly difficult to measure capstan movement, be it distance, speed or direction.

Such a tape drive capstan is from one to two inches in diameter and travels at a steady-state linear speed as high as 200 inches per second. In addition, the acceleration profile of the capstan is such that these high speeds are reached from a rest position in a millisecond or less. This operational environment makes very short sampled-data periods highly desirable, resulting in the use of tachometer discs having high line density, often in excess of 500 lines or transparent portions spread evenly around the 360° circumference of the tachometer disc. This high line density, and the resulting small pitch between adjacent transparent portions, provide a unique environment for realizing the full advantages of the present invention.

The foregoing and other features and advantages of the invention will be apparent from the following more particular description of preferred embodiments of the invention, as illustrated in the accompanying drawing.

BRIEF DESCRIPTION OF THE DRAWING

FIG. 3 is a front view of the printed circuit card, that is, the side which faces the mask of FIGS. 2 and **2*a*;**

FIGS. 4 and **4*a* are front views of one of the thin optical shims and one thick spacer shim, respectively, a plurality of these shims being laminated to form the mechanical light collimator of FIG. 1**;

FIGS. 5 and **5*a*** are a side view and a front view, respectively, of the assembly base member, showing one form of alignment means which insures accurate alignment of the two light paths;

FIG. 6 is a view of a form of the present invention having another type of alignment means, and FIG. 7 is an electrical circuit representation of the two phototransistors and the circuit card of FIG. 1.

DESCRIPTION OF THE PREFERRED EMBODIMENTS

Figure 1:
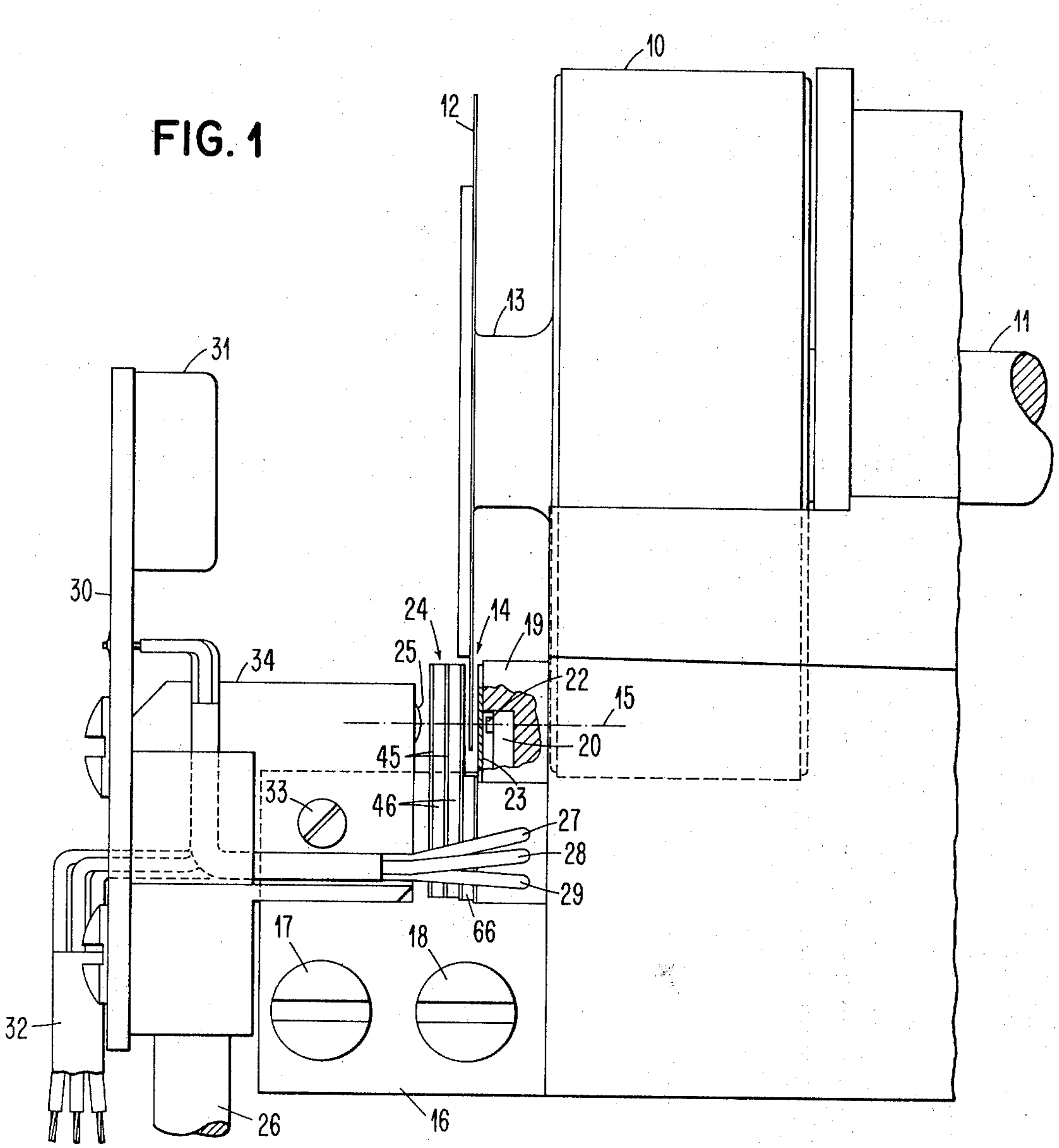
FIG. 1 is a side view of a capstan/tachometer assembly embodying the present invention, having a portion of the housing broken away to show the phototransistor circuit card.

FIG. 1 is a side view of a capstan/tachometer assembly, wherein capstan 10 is mounted directly on motor shaft 11 to rotate therewith. This side view shows the approximately one-half inch wide driving surface of the capstan, the capstan being from one to two inches in diameter. By way of example, this shaft mounted capstan and motor combination may be of the type utilizing a permanent magnet direct current motor of the type described in the IBM TECHNICAL DISCLOSURE BULLETIN, Volume 14, Number 6, Nov. 1971, at pages 1750 and 1751.

Movement of capstan 10 is measured and sensed by means of see-thru optical tachometer disc 12. This disc is made from a thin polyester base film which is structurally supported by hub 13 so as to rotate with capstan 10. The lower circumferential portion of disc 12 passes through channel 14 such that the annular seethru pattern carried by the disc passes in alignment with the optical axis 15 of the stationary portion of the two-phase digital tachometer.

This portion of the tachometer includes base member 16, which is accurately mounted on the motor housing by means of fasteners 17 and 18. Optical axis 15 is defined by components accurately mounted on base 16, as will be apparent. The motor housing and base 16 are accurately constructed with mating surfaces such that when the base is mounted on the housing, axis 15 is accurately positioned in parallel alignment with, and at a fixed point radially disposed from, the axis of rotation defined by shaft 11.

Base 16 includes housing portion 19, shown partially broken away. Within this housing is disposed circuit card 20 having two phototransistor chips 21 and 22 (FIG. 3) mounted thereon. Immediately in front of the two phototransistors, and separating the phototransistors from disc 12, is positioned stationary optical mask 23.

The opposite side of channel 14 is defined by mechanical light collimator 24 and the end 25 of an optical light fiber 26. The end of this light fiber is associated with a light bulb, not shown, and constitutes a single light source illuminating the collimator.

The electrical conductors 27, 28 and 29, associated with the two phototransistors, are connected to circuit card 30. The signals provided by the phototransistors are amplified and squared by means of electronic network 31. The processed electrical signals are then transmitted to external circuitry by way of cable 32.

By way of example, the signals provided by cable 32 may be used as feedback information in a capstan motor servomechanism to control the energization of the capstan motor. Such an exemplary servomechanism, used to maintain the speed of capstan 10, may be as shown in the IBM TECHNICAL DISCLOSURE BULLETIN, Volume 15, Number 10, Mar. 1973, at pages 2988 through 2990. By way of further example, the signal derived from cable 32 may be used to accurately control the stopping motion of capstan 10 in the manner described in U.S. Pat. No. 3,731,176 issued to J. O. Mitchell et al. By way of yet another example, the two phase displaced signals at cable 32 may be processed as described in IBM TECHNICAL DISCLOSURE BULLETIN, Volume 15, Number 4, Sept. 1972, at pages 1198 and 1199.

The assembly including optical fiber 26, circuit card 30 and cable 32 is mounted to base 16 by way of fastener 33. Base 16 and housing member 34 are dimensioned such that fastener 33 locates the end 25 of the optical fiber generally in alignment with axis 15. This alignment is, however, not critical since, as will be apparent, the left-hand side of collimator 24 is flooded with light and functions to accurately illuminate disc 12 with two parallel light rays accurately located in relation to axis 15.

Figure 2A:
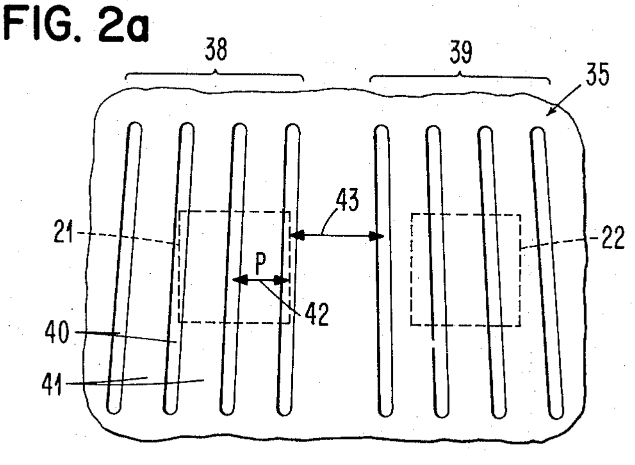
FIGS. 2 and **2*a* show the mask which covers the two phototransistors of FIG. 1**, and the mask's enlarged optical pattern, respectively.
Figure 2:
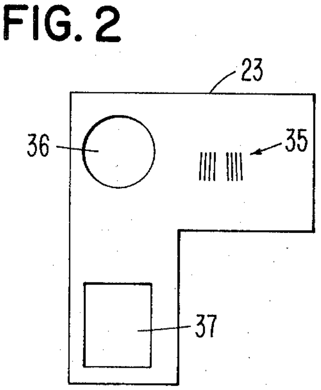

In FIG. 2, the side of mask 23 which faces disc 12 is shown. This mask includes an optical see-thru pattern generally identified by reference numeral 35. Mask 23 is accurately located such that the center of mask 35 coincides with optical axis 15. The positioning of mask 23 is facilitated by accurately dimensioned holes 36 and 37 formed therein.

With reference to FIG. 2a, pattern 35 includes two portions 38 and 39, each portion comprising a repeating pattern of transparent and opaque portions 40 and 41. The distance between the centerline of two adjacent transparent portions, as depicted by arrow 42, is defined as a critical distance, called the pitch, and designated by the letter *P*. The two optical patterns 38 and 39 are displaced by a distance $NP\pm[1/4]P$, where *N* is an integer. This distance is represented in FIG. 2*a* by arrow 43. In practice, it is desirable that distance 43, as well as distance 42, be as small as possible.

As has been mentioned, a small dimension 42 insures that a high sampled-data rate will be derived from the tachometer assembly. A small distance 43 minimizes the undesirable phase shift which will occur when the optical pattern in mask 23 is not in exact alignment with the optical pattern carried by disc 12, or when the distance between the mask and the disc varies.

The optical pattern of disc 12 is a continuous repeating pattern of transparent and opaque portions having the same pitch as the patterns 38 and 39 of mask 23. As can be seen from FIG. 2*a*, transparent portions 40 converge upward and would meet at the center of rotation of shaft 11. In the example shown, transparent portion 40 is approximately one-third the width of opaque portion 41. The advantage of utilizing this particular light-to-dark ratio is described in U.S. Pat. No. 3,723,748, issued Mar. 27, 1973 to R. L. Coburn et al.

FIG. 3 is a view of the side of circuit card 20 which faces mask 23. The use of phototransistor chips 21 and 22 allows very close spacing of these two photoelectric means, and thereby allows close spacing of the patterns 38 and 39 carried by mask 23. By way of example, the distance represented as 44 in FIG. 3 may be 0.025 inch.

Turning now to a description of mechanical light collimator 24, this collimator is made up of a lamination of alternate thin optical shims or foils 45 and intermediate thick spacer shims 46. FIG. 4 shows one of the optical shims 45, having two small openings 47 and 48. Openings 47 and 48 are located symmetrically with optical axis 15, and in fact function to define this axis. The dimensions of openings 47 and 48 are such that the light passing through opening 48 illuminates pattern 38 of mask 23, without crosstalk to pattern 39, whereas the light passing through opening 47 illuminates pattern 39 without crosstalk to pattern 38. The spatial separation of the two inside edges of openings 47 and 48 is approximately 2*P*, as indicated in FIG. 4. As with mask 23, optical shim 45 includes accurately defined locating openings 49 and 50.

By way of example, shims 45 and 46 can be formed of metal, plastic or the like. In addition, shims 45 can be formed of photographic film wherein openings 47 and 48 are transparent portions. Each of the shims 46 may be formed of a number of thin shims, each having a large opening 51.

One of the thick spacer shims 46 is shown in FIG. 4*a*. Each of these shims includes a large opening 51 which peripherally surrounds the two openings 47, 48 formed in the adjacent optical shims 45. The cavity formed by large opening 51 constitutes a light trap which functions to trap those light rays which successfully pass through openings 47 and 48, but are not in sufficient alignment with the downstream one of the like-numbered openings to pass therethrough. This trapped light is retained within the cavity formed by large opening 51 and the spatial positioning of optical shims 45 and spacing shims 46. This structure functions to produce a collimation effect whereby disk 12 is illuminated by two parallel collimated rays of light, in coincidence with patterns 38 and 39 and the underlying phototransistor chips 21 and 22. Each of the spacer shims includes accurately positioned openings 53 and 54, cooperating with the similar openings in shims 45 and mask 23.

In the embodiment shown, spacer shims 46 include one large opening 51. In this case, the thickness of shims 46, which determines the spacing of shims 45, is critical and is selected in accordance with the spacing of openings 47, 48, to minimize crosstalk between these two openings. Of course, shims 46 can be formed with two large openings, one for each of the openings 47, 48, in which case the thickness of shims 46 is much less critical since crosstalk between openings 47, 48 is precluded.

A critical portion of the present invention is the alignment means by which photoelectric means 21, 22, mask 23 and collimator 24 are positioned to accurately define optical axis 15. As will be apparent from a description of FIGS. 5 and 5*a*, base 6 is provided with a pair of manufacturing openings facilitating this accurate alignment, whereas this alignment is provided by a pair of accurately positioned posts in the structure of FIG. 6.

With reference to FIG. 5, base 16 is shown with a portion of its housing 19 broken away to disclose a cavity 56 which houses phototransistors 21 and 22 and their circuit card 20. Openings 57 and 58 are provided to receive fasteners 17 and 18. An additional opening 59 receives fastener 33. FIG. 5a is a view of base 16 as seen from the left. This view discloses cavity 56 as well as openings 60 and 61. Cavity 56 includes surfaces 62 and 63 against which the edges 64 and 65 (FIG. 3) of circuit card 20 are accurately positioned, to thereby accurately locate phototransistor chips 21 and 22. During manufacture of the assembly, openings 60 and 61 within base 16 include two projecting pins which receive not only base 16, but also mask 23 and shims 45 and 46, a spacer element 66 (FIG. 1) being provided to define the width of channel 14. This accurate positioning insures accurate alignment of the optical shim openings 47, 48 as well as patterns 38 and 39 carried by mask 23 with phototransistor chips 21 and 22 carried by circuit board 20. These assembled items are then mechanically clamped and bonded, as by way of an epoxy adhesive. The then-bonded assembly is removed from the manufacturing posts and assembled onto the capstan motor by way of fasteners 17 and 18.

An alternate arrangement for providing this alignment is shown in FIG. 6 wherein a base 70 is provided with a pair of extending posts 71 and 72. These extending posts receive mechanical light collimator 73, formed by alternate optical and spacer shims 74 and 75, as above described. Collimating means 73 cooperates with light source 76 to provide two parallel light paths 77 and 78 along optical axis 15.

Base 70 includes cavity 79 which accurately locates two phototransistor chips 80 and 81 along axes 15, 77 and 78. Posts 71 and 72 carry spacers 82 and 83 which define a channel 84 through which movable optical member 85 may pass, with its optical pattern in alignment with the optical patterns carried by mask 86.

The optical patterns carried by mask 86 and movable member 85 are generally identical to those described in connection with FIG. 2a, with the exception that in the embodiment of FIG. 6, member 85 moves linearly, rather than rotating about an axis. Thus, the patterns of mask 86 corresponding to patterns 38 and 39 of FIG. 2 are parallel, rather than being formed along a radius drawn from a center of rotation, such as that defined by shaft 11 of FIG. 1.

FIG. 7 is an electrical circuit representation of the phototransistors and the electrical network 31 carried by circuit card 30 of FIG. 1.

While the invention has been particularly shown and described with reference to preferred embodiments thereof, it will be understood by those skilled in the art that various changes in form and details may be made therein without departing from the spirit and scope of the invention.

What is claimed is:

1. A tachometer assembly, comprising:

a movable member having an optical see-thru portion including a plurality of alternating opaque and transparent regions, stationary photoelectric means positioned on one side of said movable member, a stationary mask covering said photoelectric means and having an optical see-thru portion including a plurality of alternating opaque and transparent regions of like dimension to those of said movable member, stationary mechanical light collimating means positioned on the other side of said movable member, said light collimating means including a plurality of spaced thin optical shims, each having at least one small opening, said openings being aligned to form a light path, a stationary light source positioned to illuminate said movable member through said collimating means, and alignment means cooperating with said photoelectric means, said mask and said collimating means to accurately align the light path formed by said optical shims with the mask's see-thru portion and said photoelectric means.

2. The tachometer assembly defined in claim 1 wherein said light collimating means includes:

a plurality of relatively thick spacer shims, one spacer shim being positioned between adjacent optical shims to thereby mechanically position and separate said optical shims along said light path, each of said spacer shims having a large opening which surrounds the small openings in the two adjacent optical shims, to thereby define a light trap to improve the collimating effect of said optical shims.

3. The tachometer assembly defined in claim 2 wherein said alignment means includes a base member and locating means carried by said base member and cooperating with said photoelectric means, said mask and the shims of said collimating means to accurately align the assembly.

4. The tachometer assembly defined in claim 3 wherein said alignment means includes a positioning surface cooperating with said photoelectric means, and two posts cooperating with positioning openings formed in said mask and the shims of said collimating means.

5. The tachometer assembly defined in claim 4 wherein said photoelectric means includes two phototransistor chips which are mounted with close spacing on a circuit card, wherein said stationary mask includes two individual optical see-thru portions spaced at said close spacing and cooperating with the optical see-thru portion of said movable member to produce two 90°-phase shifted signals from said phototransistor chips as said movable member moves, and wherein each of said optical shims includes two openings spaced at said close spacing to thereby define two parallel light paths having minimum crosstalk.

6. A tape drive capstan/tachometer assembly, comprising:

a tape drive capstan mounted on a shaft and rotatable on the axis defined thereby, an optical see-thru tachometer disc axially spaced from said capstan and rotatable therewith, said disc including a circular pattern of alternately repeating opaque and transparent portions, the passage of one of said transparent portions defining a distance unit of rotation of said capstan, stationary photoelectric means located on a first side of said disc, a stationary optical mask mounted between said photoelectric means and said disc, said mask including a see-thru pattern of identical pitch to said disc pattern, mechanical light collimating means mounted on the opposite side of said disc and including a plurality of spaced openings which define a light path parallel to said axis, a light source illuminating said opposite side of said disc through said collimating means, and alignment means cooperating with said photoelectric means, said optical mask and said collimating means to accurately position said mask and said photoelectric means in alignment with said light path.

7. The capstan/tachometer assembly defined in claim 6 wherein said mechanical light collimating means comprises:

a plurality of thin collimating shims, each collimating shim having at least one small opening formed therein, said collimating shims being spaced from one another along said light path with said openings in alignment, and a plurality of thick spacer shims, at least one of which is positioned between each pair of said collimating shims to physically separate and mount the same, said spacer shims having a large opening surrounding the small opening in said collimating shims, to thereby define a light trap improving the collimating quality of said small openings.

8. The capstan/tachometer assembly defined in claim 7 wherein said photoelectric means includes two phototransistors mounted at a close spacing, wherein said stationary optical mask includes two of said see-thru patterns spaced at said close spacing, said close spacing being such that movement of said disc provides two 90°-phase shifted signals from said phototransistors, wherein said collimating shims include two openings in each shim, the two openings being spaced at said close spacing to thereby define two parallel light paths, one for each of the phototransistor/mask pairs.

9. The capstan/tachometer assembly defined in claim 8 wherein phototransistors are formed as chips mounted on a circuit card, wherein said alignment means includes surface means accurately positioned on said circuit card, said optical mask and said collimating means relative to said axis.

* * * * *